US009767586B2

(12) United States Patent
Liang et al.

(10) Patent No.: US 9,767,586 B2
(45) Date of Patent: *Sep. 19, 2017

(54) CAMERA SYSTEM AND METHOD FOR HAIR SEGMENTATION (71) Applicant: Microsoft Technology Licensing, LLC, Redmond, WA (US)

(72) Inventors: Lin Liang, Redmond, WA (US); Christian F. Huitema, Clyde Hill, WA (US); Matthew Adam Simari, Seattle, WA (US); Sean Eron Anderson, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 325 days.

This patent is subject to a terminal disclaimer.

(21) Appl. No.: 14/553,912

(22) Filed: Nov. 25, 2014

(65) Prior Publication Data
US 2016/0014392 A1   Jan. 14, 2016

Related U.S. Application Data (60) Provisional application No. 62/023,651, filed on Jul. 11, 2014.

(51) Int. Cl.
*G06T 11/60* (2006.01)
*H04N 7/18* (2006.01)
(Continued)

(52) U.S. Cl.
CPC ............... *G06T 11/60* (2013.01); *G06T 7/11* (2017.01); *G06T 7/162* (2017.01); *H04N 7/18* (2013.01);
(Continued)

(58) Field of Classification Search
CPC .......... G06T 11/60; G06T 2207/10024; G06T 2207/10028; G06T 2207/30201;
(Continued)

(56) References Cited

U.S. PATENT DOCUMENTS 8,306,333 B2 * 11/2012 Lai ..................... G06K 9/00234
348/586
8,682,029 B2    3/2014 Piramuthu
(Continued)

FOREIGN PATENT DOCUMENTS

CN          102436637 A      5/2012

OTHER PUBLICATIONS

Zollhofer et al., Automatic reconstruction of personalized avatar from 3D face scan, vol. 22, Apr. 1, 2011, pp. 195-202.*
(Continued)

*Primary Examiner* — Behrooz Senfi
(74) *Attorney, Agent, or Firm* — Alleman Hall Creasman & Tuttle LLP (57) ABSTRACT A method for operating an image processing device coupled to a color camera and a depth camera is provided. The method includes receiving a color image of a 3-dimensional scene from a color camera, receiving a depth map of the 3-dimensional scene from a depth camera, generating an aligned 3-dimensional face mesh from a plurality of color images received from the color camera indicating movement of a subject's head within the 3-dimensional scene and form the depth map, determining a head region based the depth map, segmenting the head region into a plurality of facial sections based on both the color image, depth map, and the aligned 3-dimensional face mesh, and overlaying the plurality of facial sections on the color image.

20 Claims, 7 Drawing Sheets (51) Int. Cl.
*G06T 7/11* (2017.01)
*G06T 7/162* (2017.01)
*H04N 13/02* (2006.01)

(52) U.S. Cl.
CPC .............. *G06T 2207/10024* (2013.01); *G06T 2207/10028* (2013.01); *G06T 2207/30201* (2013.01); *H04N 13/0239* (2013.01); *H04N 13/0271* (2013.01)

(58) Field of Classification Search
CPC ....... G06T 7/0081; G06T 7/0093; H04N 7/18; H04N 13/0271; H04N 13/0239; H04N 2013/0074
USPC .......................................................... 348/47
See application file for complete search history.

(56) References Cited

U.S. PATENT DOCUMENTS

| | | | | |
|---|---|---|---|---|
| 2004/0213460 | A1* | 10/2004 | Chen .................. | G06K 9/00362 382/199 |
| 2011/0142335 | A1* | 6/2011 | Ghanem ............. | G06F 17/3025 382/165 |
| 2011/0194762 | A1 | 8/2011 | Haibing | |
| 2011/0249756 | A1* | 10/2011 | Doepke .............. | G06K 9/00234 375/240.24 |
| 2012/0026277 | A1* | 2/2012 | Malzbender ............ | H04N 7/15 348/14.07 |
| 2012/0293635 | A1* | 11/2012 | Sharma .............. | G06K 9/00234 348/50 |
| 2012/0327172 | A1* | 12/2012 | El-Saban ........... | G06K 9/00228 348/14.02 |
| 2014/0160123 | A1* | 6/2014 | Yang ....................... | G06T 17/00 345/420 |

OTHER PUBLICATIONS

Tong et al., Scanning 3d full human bodies using kinects, IEEE, Apr. 2012, pp. 643-650.*

Hirzer, et al., "An Automatic Hybrid Segmentation Approach for Aligned Face Portrait Images", In Proceedings of the Workshop of the Austrian Association for Pattern Recognition, Published on: Sep. 2009, 12 Pages.

Lee, et al., "An Algorithm for Automatic Skin Smoothing in Digital Portraits", In Proceedings of the 16th IEEE International Conference on Image Processing, Published on: Nov. 7, 2009, pp. 4.

Dahan, et al., "Combining Color and Depth for Enhanced Image Segmentation and Retargeting", In Proceedings of Visual Computer, vol. 28, Issue 12, Published on: Dec. 2012, pp. 5.

Shen, et al., "Image Based Hair Segmentation Algorithm for the Application of Automatic Facial Caricature Synthesis", In Journal of the Scientific World, vol. 2014, Published on: Jan. 29, 2014, pp. 7.

Wighton, et al., "A Fully Automatic Random Walker Segmentation for Skin Lesions in a Supervised", In Proceedings of Medical Image Computing and Computer-Assisted Intervention, Published on: Sep. 20, 2009, 8 Pages.

* cited by examiner

CAMERA SYSTEM AND METHOD FOR HAIR SEGMENTATION

CROSS-REFERENCE TO RELATED APPLICATIONS

This application claims priority to U.S. Provisional Application No. 62/023,651, filed Jul. 11, 2014 and entitled "HAIR AND SKIN IMAGE SEGMENTATION" the complete contents of which are hereby incorporated herein by reference for all purposes.

BACKGROUND

In a multitude of applications (e.g., photo editors, games, etc.), there often is a need to take an image of an individual or other subject and identify/understand the segmentation between different parts of that subject, for example a segmentation between hair and skin. For instance, hair and skin segmentation may be used in automatic hair generation for personalized avatars, background blur for privacy in video chat, etc. In existing skin/hair segmentation methods, typical approaches require some type of user interface having a workflow that asks the user to explicitly indicate hair and skin components. For example, a user may be prompted to manually identify pixels in specific regions of an image.

SUMMARY

A method for operating an image processing device coupled to a color camera and a depth camera is provided. The method includes (1) receiving a color image of a 3-dimensional scene from a color camera; (2) receiving a depth map of the 3-dimensional scene from a depth camera; (3) generating an aligned 3-dimensional face mesh from a plurality of color images received from the color camera indicating movement of a subject's head within the 3-dimensional scene and from the depth map; (4) determining a head region based on the depth map; (5) segmenting the head region into a plurality of facial sections based on both the color image, depth map, and the aligned 3-dimensional face mesh; and (6) overlaying the plurality of facial sections on the color image. In this way, an image can be quickly, accurately, and efficiently segmented. This segmentation approach also increases the efficiency of downstream image processing operations. It will be appreciated that the segmenting of the head region (e.g., hair region) may be automatically implemented independent of user interaction with the image processing device. Thus, the aforementioned technique can be implemented without the need for explicit user input.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
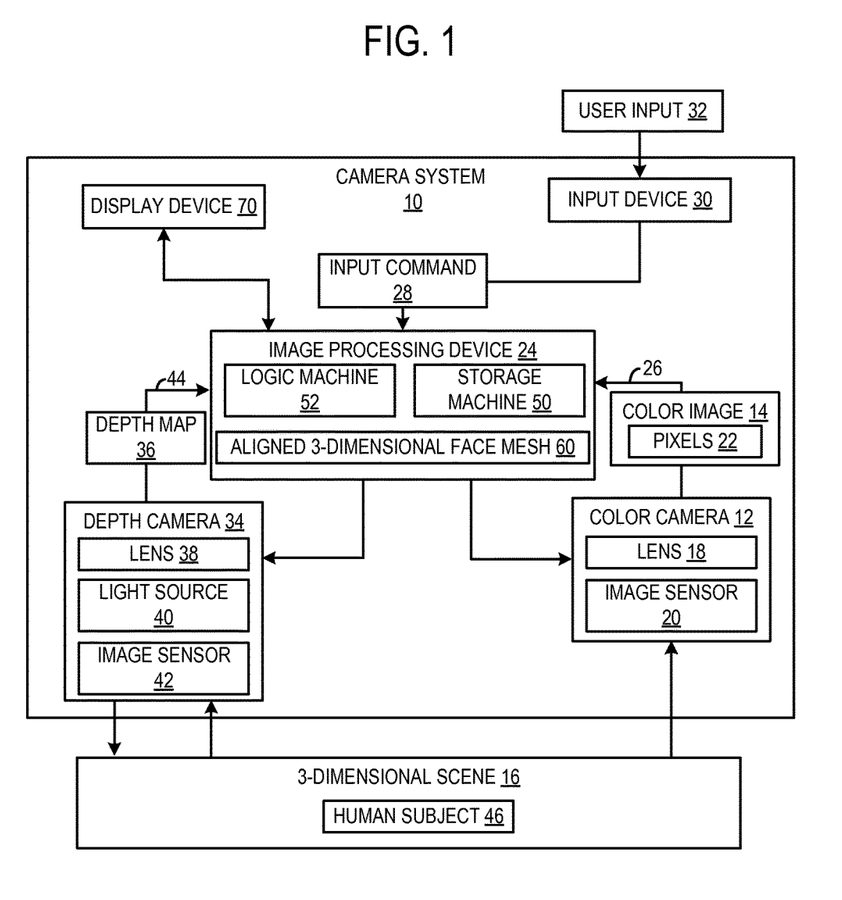
FIG. 1 is a schematic depiction of a camera system including an image processing device, depth camera, and color camera.

FIG. 1 schematically depicts a camera system 10 configured to generate and process images. It will be appreciated that camera system 10 may be included in a computing device, gaming console, entertainment console, etc. The camera system 10 includes a color camera 12 configured to generate a color image 14 of a 3-dimensional scene 16 (e.g., 3-dimensional environment). The color camera 12 may include a lens 18 and an image sensor 20. The color camera 12 and specifically the image sensor 20 may be configured to generate the color image 14, which includes a plurality of pixels 22. Each of the pixels in the color image 14 may have a red, green, and blue (RGB) value, in one example, though other color spaces and encoding schemas may be used. It will be appreciated that the color camera 12 may include additional components, such as optical components for transferring light from the lens to the image sensor, processing electronics, etc. As shown, the color camera 12 is in electronic communication (e.g., wired and/or wireless communication) with an image processing device 24. Specifically, the color image 14 may be sent to the image processing device 24 from the color camera 12. Arrow 26 denotes the transfer of the color image to the image processing device from the color camera.

The color camera 12 may also receive data such as commands, instructions, etc., from the image processing device 24. For instance, the image processing device 24 may receive an input command 28 from an input device 30. The input device 30 may include one or more of a keyboard, touch screen, trackpad, mouse, controller, etc. The input command 28 may be generated in response to receiving a user input 32 at the input device 30. The input command may be a request for generation of an image, starting a program, etc.

The camera system 10 further includes a depth camera 34 configured to generate a depth map 36 of the 3-dimensional scene 16. The depth map 36 may include depth values assigned to pixels. Various depth-sensing technologies maybe be employed with depth camera 34, including time-of-flight, structured light, etc. The depth camera 34 may include various components for implementing the aforementioned functionality, such as a lens 38, light source 40, and image sensor 42. Additional depth camera components may include driver electronics (not shown), computation electronics (not shown), etc. As shown, the depth camera 34 is in electronic communication (e.g., wired and/or wireless communication) with the image processing device 24. Specifically, the depth map 36 is sent from the depth camera 34 to the image processing device 24, indicated via arrow 44. Alternatively, the depth map may be generated by image processing device 24 based on raw sensor data obtained by depth camera 34.

The image processing device 24 may include a storage machine 50 and a logic machine 52. Logic machine 52 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 50 includes one or more physical devices configured to hold instructions executable by the logic machine to implement the methods and processes described herein. When such methods and processes are implemented, the state of storage machine 50 may be transformed—e.g., to hold different data.

Storage machine 50 may include removable and/or built-in devices. Storage machine 50 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 50 may include volatile, nonvolatile, dynamic, static, read/write, read-only, random-access, sequential-access, location-addressable, file-addressable, and/or content-addressable devices.

It will be appreciated that storage machine 50 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 52 and storage machine 50 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The image processing device 24 is configured to determine a head region of a human subject 46 in the 3-dimensional scene 16 and segment the head region into a plurality of sections, such as a skin section and a hair section. Segmenting the image into a plurality of sections may enable simplified downstream processing of the image, thereby increasing the processing efficiency of the system.

As previously discussed, the image processing device 24 is configured to receive the color image 14 of the 3-dimensional scene 16 from the color camera 12 and receive the depth map 36 of the 3-dimensional scene from the depth camera 34.

The image processing device 24 is further configured to generate an aligned 3-dimensional face mesh 60 from movement of a subject's head within the 3-dimensional scene 16 detected via the color camera 12 and from the depth map 36. It will be appreciated that the face mesh may include a collection of vertices, edges, and faces that defines the shape of an object. The image processing device 24 is further configured to automatically determine a head region based the depth map in response to generating the color image and depth map. In one example, automatically determining the head outline may include using a nose-tip as a seed point in the depth map and applying a head outline algorithm to the depth map.

The image processing device is also configured to segment the head region into a first section and a second section based on the color image, the depth map, and aligned 3-dimensional face mesh, in response to determining the head region. The first section may be a skin section and the second section may be a hair section, in one example. Thus in such an example, segmenting the head region includes separately determining a skin section and a hair section of the color image. The image processing device is also configured to overlay the first and second sections on the color image. Therefore, an overlaid image may be generated via the image processing device. The overlayed image may be used to ease analyzation of the image during subsequent processing operations, programmatic functions, etc. The camera system 10 also includes a display device 70 for displaying the aforementioned images.

Figure 2:
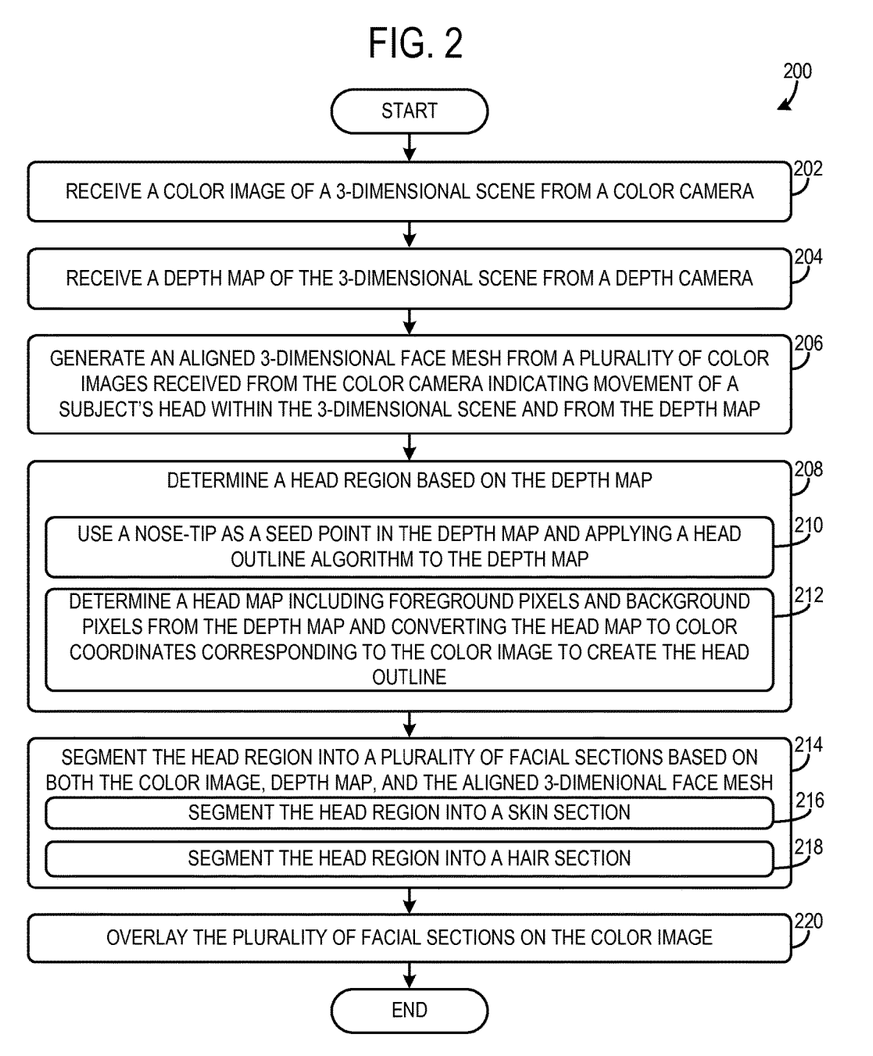
FIG. 2 depicts a method for operating an image processing device coupled to a depth camera and color camera.

FIG. 2 shows a method 200 for operating an image processing device coupled to a color camera and a depth camera. The method 200 may be implemented via the camera system 10 discussed above with regard to FIG. 1 or may be implemented by another suitable camera system.

At 202, the method includes receiving a color image of a 3-dimensional scene from a color camera. The color image may include red, green, and blue (RGB) values assigned to a plurality of pixels.

Next at 204, the method includes receiving a depth map of the 3-dimensional scene from a depth camera. The depth map may include depth values corresponding to a plurality of pixels. In one example, the color image and depth map may be generated in response to user input received via the image processing device. However, in other examples, the color image and depth map may be automatically generated. In another example, the pixel resolution of the color image may be greater than the pixel resolution of the depth image.

At 206, the method includes generating an aligned 3-dimensional face mesh from a plurality of color images received from the color camera indicating movement of a subject's head within the 3-dimensional scene and from the depth map. The aligned 3-dimensional face mesh may be a 3-dimensional rendering of a subject's head. For example, the color camera may take a bunch of samples from a plurality of images (e.g., a video stream) of a subject in the 3-dimensional scene. The samples may then be used to render a triangular mesh with features (e.g., facial features) laid on top. The facial features may include eyes, mouth, lips, nose, brow, facial expressions, etc.

Next at 208, the method includes determining a head region based on the depth map. Determining the head region may include at 210 using a nose-tip as a seed point in the depth map and applying a head outline algorithm to the depth map, in one example. Additionally in one example, determining the head region may include at 212 determining a head map including foreground pixels and background pixels from the depth map and converting the head map to color coordinates corresponding to the color image to create the head region. In one example, the depth may be used to determine a head region boundary. Once, the head region boundary is determined the head region boundary may be applied to the color image. It will be appreciated that the head region may be defined by a head outline separating the head classified pixels from background pixels. Still further in one example, determining the head region may be automatically implemented independent of user interaction with the image processing device. In yet another example, the head region may be a binary map and/or the head region may be calculated based on a Moore-Neighborhood algorithm. It will be appreciated that a Moore-Neighborhood comprises eight cells surrounding a central cell on a two-dimensional square lattice. Therefore, a Moore-Neighborhood algorithm is configured to find a contour of a given graph based on the Moore-Neighborhood.

At 214, the method includes segmenting the head region into a plurality of facial sections based on the color image, depth map, and the aligned 3-dimensional face mesh. In one example, segmenting the head region may be automatically implemented, independent of user interaction with the image processing device. Additionally, segmenting the head region into a plurality of facial sections may include at 216 segmenting the head region into a skin section and at 218 segmenting the head region into a hair section. Thus, in one example the plurality of facial regions include a skin section and a hair section. However, additional or alternative facial sections may be segmented. Further in one example, the skin section may include a nose sub-region, an eye sub-section, a mouth sub-section, and an ear sub-section. In one example, the skin section may be automatically inferred based on a fringe detector, a prior skin red green blue (RGB) color threshold, and the aligned 3-dimensional face mesh. The fringe detector is an algorithm discussed in greater detail herein. Further in one example, the plurality of facial sections may be segmented based on an energy function configured to determine the energy cost of pixels for each of the facial sections. The energy function is discussed in greater detail herein. Further in one example, a border between the hair section and the skin section may be determined based on angular orientations of pixels in the color image. Still further in one example, a Sobel edge detector may be used to determine the skin section. The Sobel edge detector is discussed in greater detail herein. In yet another example, segmenting the head region may include converting the color image to a YCbCr image and determining a blue difference chroma (Cb) and a red different chroma (Cr) joint histogram. It will be appreciated that YCbCr is a family of color spaces.

At 220, the method includes overlaying the plurality of facial sections on the color image. In this way, the sections may be combined with the color image to enable the segmentation of the image to be easily used for downstream processing operations.

Figure 3:
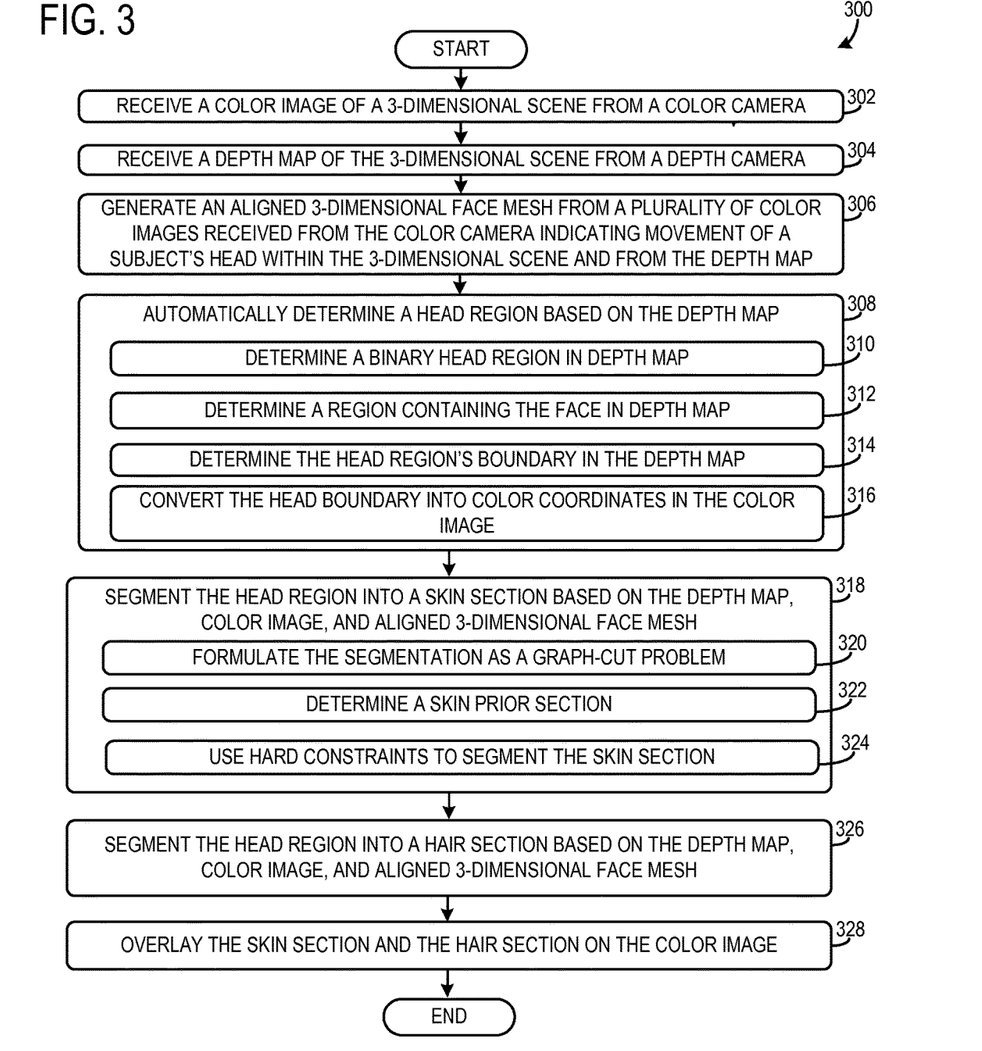
FIG. 3 depicts another method for operating an image processing device coupled to a depth camera and color camera.

FIG. 3 shows a method 300 for operating an image processing device coupled to a color camera and a depth camera. The method 300 may be implemented via the camera system 10 discussed above with regard to FIG. 1 or may be implemented by another suitable camera system.

At 302, the method includes receiving a color image of a 3-dimensional scene from a color camera. As previously discussed, the color image may include red, green, and blue (RGB) values assigned to a plurality of pixels.

Next at 304, the method includes receiving a depth map of the 3-dimensional scene from a depth camera. As previously discussed, the depth map may include depth values corresponding to a plurality of pixels.

At 306, the method includes generating an aligned 3-dimensional face mesh from a plurality of color images received from the color camera indicating movement of a subject's head within the 3-dimensional scene and from the depth map. The aligned 3-dimensional face mesh may be generated via a variety of machine vision methods (e.g. Real-Time Combined 2D+3D Active Appearance Models by Jing Xiao et al. in *Proceedings of the IEEE Conference on Computer Vision and Pattern Recognition*, Vol. 2, pp. 535-542). In one example, a number of images of the subject may be captured and then analyzed to generate a model with specific identified facial components, such as eyes, nose, mouth, ears, etc. Once these components are identified, they can be overlaid on top of the color image frame and used for various purposes in the segmentation mechanisms discussed below.

Further in one example, a head rectangular region may be determined in the color image, depth map, and aligned 3-dimensional face mesh. Specifically, the face in the image, map, and mesh may be bounded by a rectangle and then increased in size (e.g., doubled) to obtain the head rectangular region. It will be appreciated that in one example, the downstream processing operations may only be applied to the head rectangular region.

At 308, the method includes automatically determining a head region based on depth map. Determining the head region may include at 310 determining a binary head region in depth map. Determining the binary head region may include using a threshold depth coordinate to determine a head boundary separating a head region from a non-head region (e.g., background region). It will be appreciated that the head region may include a subject's shoulders. It will also be appreciated that step 308 may be implemented in response to generating the color image and the depth map. Further in one example, calibration data between the depth map and color image may be used to determine the head region.

One example approach for determining the binary head region at 310 is as follows. First, for each pixel in the depth map, a binary head region (e.g., binary head map) is generated which identifies whether the depth pixel is foreground (i.e., part of the subject) or background (i.e., not part of the subject). This may be determined from the aligned 3-dimensional face mesh using face mesh depth values. First, the maximum Z value $Z_{max}$ of the mesh may be computed and a constant may be added to generate a depth value that is used in a threshold operation. Specifically, in one example, a constant value of 0.078 meters is added to generate a threshold depth $Z_h$: $Z_h = Z_{max} + 0.078$. Then the following threshold operation is applied:

$$H_i = \begin{cases} 1 & \text{if } D_i < Z_h \\ 0 & \text{if } D_i \geq Z_h \end{cases} \quad \text{[Equation (1)]}$$

Where $D_i$ is the depth value of the i-th pixel, and $H_i$ is the i-th pixel's value on the binary head region (e.g., binary head map). In other words, a given depth pixel is identified as foreground (i.e., part of the subject) if its depth is less than $Z_h$, and otherwise if its depth is greater than or equal to $Z_h$.

Determining the head region may also include at 312 determining a region (e.g., connection region) containing the face from the segmented binary image generated using equation (1). In one example, a seed point, such as the subject's nose-tip may be used in an algorithm to find the connection region. The nose-tip may be determined using the aligned face mesh, in one example.

Determining the head region may also include at 314 determining the head region's boundary in the depth map. In one example, the boundary may be calculated through application of a Moore-Neighborhood algorithm. An example Moore-Neighborhood algorithm is given below;
Input: A square tessellation, T, containing a connected component P of black cells.
Output: A sequence B (b1, b2, . . . , bk) of boundary pixels i.e. the contour.
Define M(a) to be the Moore neighborhood of pixel a.
Let p denote the current boundary pixel.
Let c denote the current pixel under consideration i.e. c is in M(p).
Let b denote the backtrack of c (i.e. neighbor pixel of p that was previously tested)

```
Begin
   Set B to be empty.
   From bottom to top and left to right scan the cells of T until a black
pixel,
   s, of P is found.
   Insert s in B.
   Set the current boundary point p to s i.e. p=s
   Let b = the pixel from which s was entered during the image scan.
   Set c to be the next clockwise pixel (from b) in M(p).
   While c not equal to s do
      If c is black
         insert c in B
         Let b = p
         Let p = c
         (backtrack: move the current pixel c to the pixel from
         which p was entered)
         Let c = next clockwise pixel (from b) in M(p).
      Else
         (advance the current pixel c to the next clockwise pixel
in
         M(p) and update backtrack)
         Let b = c
         Let c = next clockwise pixel (from b) in M(p).
      end If
   end While
End
```

(http://en.wikipedia.org/wiki/Moore_neighborhood)

However, it will be appreciated that other Moore-Neighborhood algorithms may be utilized.

Determining the head region may also include at 316 converting the head boundary into color coordinates in the color image. In one example, the head region's boundary in the depth may be converted into color coordinates in the color image by using the camera's calibration data.

The method further includes at 318 segmenting the head region into a skin section based on the depth map, color image, and aligned 3-dimensional face mesh. It will be appreciated that step 318 may be implemented in response to determining the head outline. In one example, segmenting the head region into the skin section may include implementing a fringe detector configured to determine if a pixel is excluded from the face section based on the edge orientation of the pixel.

Segmenting the skin section may also include at 320 formulating the segmentation as a graph-cut problem. Formulating the segmentation of a graph-cut problem may include implementing a graph-cut energy-reduction (e.g., energy minimization) mechanism that seeks to determine the desired labeling X (i.e., the labeling of pixels in the head region as skin or non-skin) to reduce (e.g., minimize) the following energy equation:

$$E(X) = \Sigma_{i \in v} \Sigma_I(x_i) + \lambda \Sigma_{(i,j) \in \epsilon} E_p(x_i, x_j) \quad \text{[Equation (2)]}$$

The first term of Equation (2)—$\Sigma_{i \in v} E_I(x_i)$— is directed to energy levels associated with labeling a given pixel as skin ($x_i=1$) or otherwise ($x_i=0$). Lines 1-3 of Equation (3) below relate to this first term and are respectively applicable to pixels that are pre-determined to be in a foreground region $\mathcal{F}$ (e.g., definitely skin); a background region $\mathcal{B}$ (e.g., definitely not skin); and an uncertain region $\mathcal{U}$.

$$\begin{cases} E_1(x_i = 1) = 0 & E_1(x_i = 0) = \infty & \forall i \in \mathcal{F} \\ E_1(x_1 = 1) = \infty & E_1(x_i = 0) = 1 & \forall i \in \mathcal{B} \\ E_1(x_i = 1) = \frac{d_i^{\mathcal{F}}}{d_i^{\mathcal{F}} + d_i^{\mathcal{B}}} & E_1(x_i = 0) = \frac{d_i^{\mathcal{B}}}{d_i^{\mathcal{F}} + d_i^{\mathcal{B}}} & \forall i \in \mathcal{U} \end{cases} \quad \text{[Equation (3)]}$$

The aligned 3-dimensional face mesh may be used to apply a hard constraint, in which specific pixels in the map are designated as being in the foreground region and therefore definitely are the skin of the subject. $\mathcal{F}$ is the foreground region (e.g., skin region), $\mathcal{B}$ is the background region (e.g., non-skin region), and $\mathcal{U}$ is the uncertain region. Regions corresponding to the subject's eyes, nose, and mouth may be designated as foreground region pixels for purposes of Equation (3). The top line of Equation (3) applies to the foreground pixels, and essentially says that the energy cost of labeling them as skin ($x_i=1$) is very low (zero), and labeling them as not skin ($x_i=0$) entails a very high energy cost ($\infty$).

A background region (e.g., non-skin region) hard constraint may also be applied to designate background pixels (e.g., non-skin pixels) for Equation (3). Starting with the head region a hard constraint may be applied, in which it is assumed that a small band of pixels immediately within the upper portion of the head region boundary are definitely not skin (e.g., the head outline above the ears). In fact, they most likely are the subject's hair. The pixels in this region are therefore designated as being in the background region (e.g., definitely not skin) for the purposes of Equation (3). The second, middle line of Equation (3) may be applied to non-skin pixels, and essentially says that the energy cost of labeling such a pixel as skin ($x_i=1$) is very high ($\infty$), and labeling it as not skin ($x_i=0$) entails a very low energy cost (0). Pixels not designated as foreground or background via the hard constraints may be deemed to be in the uncertain region $\mathcal{U}$. In the bottom line of Equation (3), energy labeling costs for these pixels are based on the distance between the color of the pixels and foreground and background color distributions.

In one example method, the color image may be an RGB image and may be converted into the YCbCr color space first, and then a computation is performed to compute the Cb and Cr joint histogram of the possible foreground (e.g., skin) region and the background (e.g., non-skin) region, respectively. Cb and Cr are selected in this example because they typically are less sensitive to lighting changes. Cb is a blue-difference chroma component and Cr is a red-difference chroma component.

Having thus determined foreground and background color distributions, the bottom line of Equation (3) may be applied to the pixels in the uncertain region. For the given pixel under consideration, $d_i^{\mathcal{F}}$ is the distance of that pixel's color from the foreground color distribution and 4 is the distance of that pixel's color from the background color distribution. For uncertainty region pixels, Equation (3) shows that the cost of labeling a pixel as skin decreases as the pixel's color gets closer to that of the foreground color distribution, and vice versa. Similarly, the cost of labeling a pixel as "not skin" decreases as that pixel's color gets closer to that of the background color distribution, and vice versa.

The second term of Equation (2)—$\lambda \Sigma_{(i,j) \in \varepsilon} \Sigma_p(x_i, x_j)$—addresses energy costs associated with how a pixel is labeled relative to the labels applied to other pixels, typically pixels that are in the vicinity of the pixel under study. As a general proposition, energy costs are lower when pixels that are close in color are given the same label and pixels that are distant in color are given different labels, and vice versa. Specifically, $E_p(x_i, x_j)$ is defined as follows:

$$E_p(x_i, x_j) = |x_i - x_j| \cdot \frac{1}{1 + \|C_i - C_j\|^2} \quad \text{[Equation (4)]}$$

Here $\|c_i-c_j\|^2$ is the L2 norm of the color distance between two pixels i and j.

At 322 the method includes determining a skin prior section. An example pseudo-code which may be used to determine the skin prior section may be as follows:

If fringe is detected
    Skin prior section = the face mask region below the brows.
else
    Skin prior section = the full face region ∩ the skin section from the
skin color prior model.

In the pseudo-code, the skin section may be computed from the aligned face mesh. In one example, the skin section may be determined based on a fringe detector. In such an example, the fringe detector may be based on a Sobel edge detector. The Sobel edge detector may use a Sobel operator which is a discrete differentiation operator, computing an approximation of the gradient of the image intensity function. The fringe detector may consider pixels with strong edge energy and/or have an orientation which is within a threshold angle range which is close to vertical (e.g., an angle range between π/4 and 3π/4). In one example, if the number of possible fringe pixels is larger than a threshold value, then it may be determined that the image has a fringe.

Additionally in one example, the skin section may be segmented based on the following pseudo-code:

Distance = max( 95-R, max( 40-G, max( 20-B, max( 15 − ( max( R, max( G, B ) ) − min( R, min( G, B ) ) ), max( 15-(R − G), B-R ) ) ) );
where R, G and B range from 0 to 255 and are the color channel values of a given pixel;
    Skin mask value $S_i$ for the i-th pixel = 1 (white) if distance ≤ 30;
    Skin mask value $S_i$ for the i-th pixel = 0 (black) if distance > 30

In this example, the RGB color model may be derived from analysis of many examples of human skin, perhaps thousands or more. And again, the output of this color model may be used to generate a skin section.

The method 300 further includes at 326 segmenting the head region into a skin section based on the depth map, color image, and aligned 3-dimensional face mesh. It will be appreciated that step 326 may be implemented in response to segmenting the skin region. In one example, to get the hair region, the other sections (e.g., head prior section, skin region, etc.) in the head region may be considered. Additionally, the likelihood the pixels being in the hair region may be determined based on Equation (3). Additionally in one example, the hair region may also be determined based on a max flow analysis. At 328 the method includes overlaying the skin section and the hair section on the color image. It will be appreciated that step 328 may be implemented in response to segmenting the head region into the skin section and the hair section.

Figure 4:
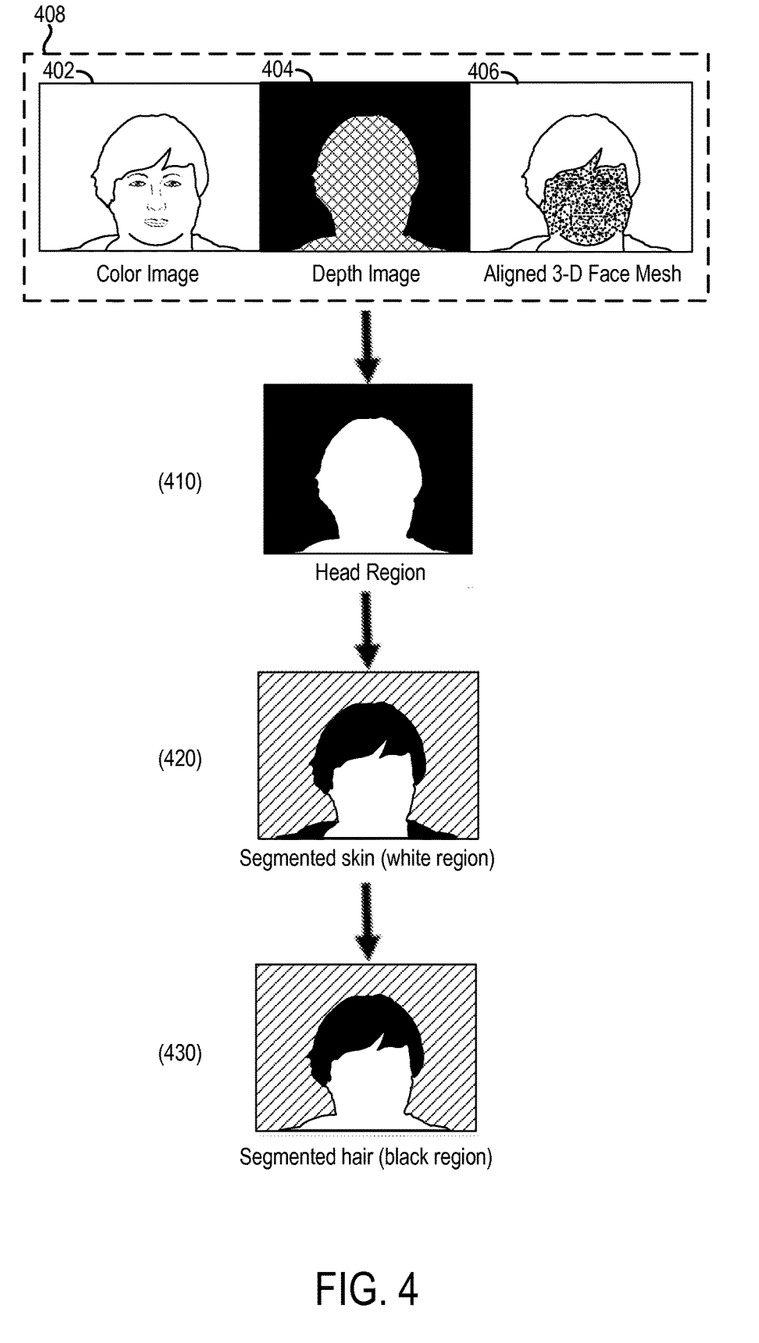
FIG. 4 depicts an example implementation of a process flow for segmenting a subject into hair and skin regions given a color image and a depth map associated with the subject.
Figure 5:
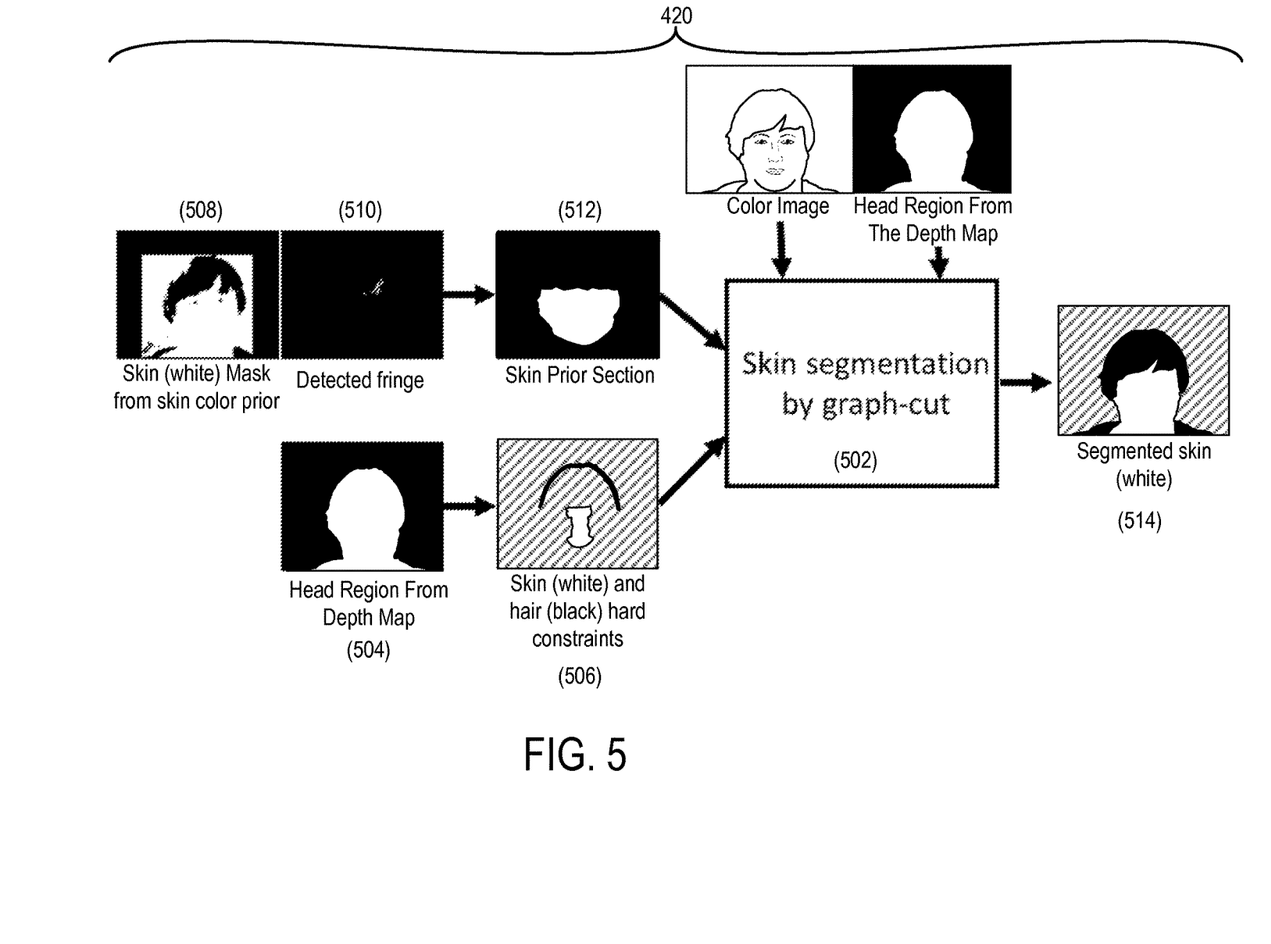
FIG. 5 depicts an example implementation of a process flow for segmenting a skin region given a color image and a depth map associated with the subject.
Figure 6:
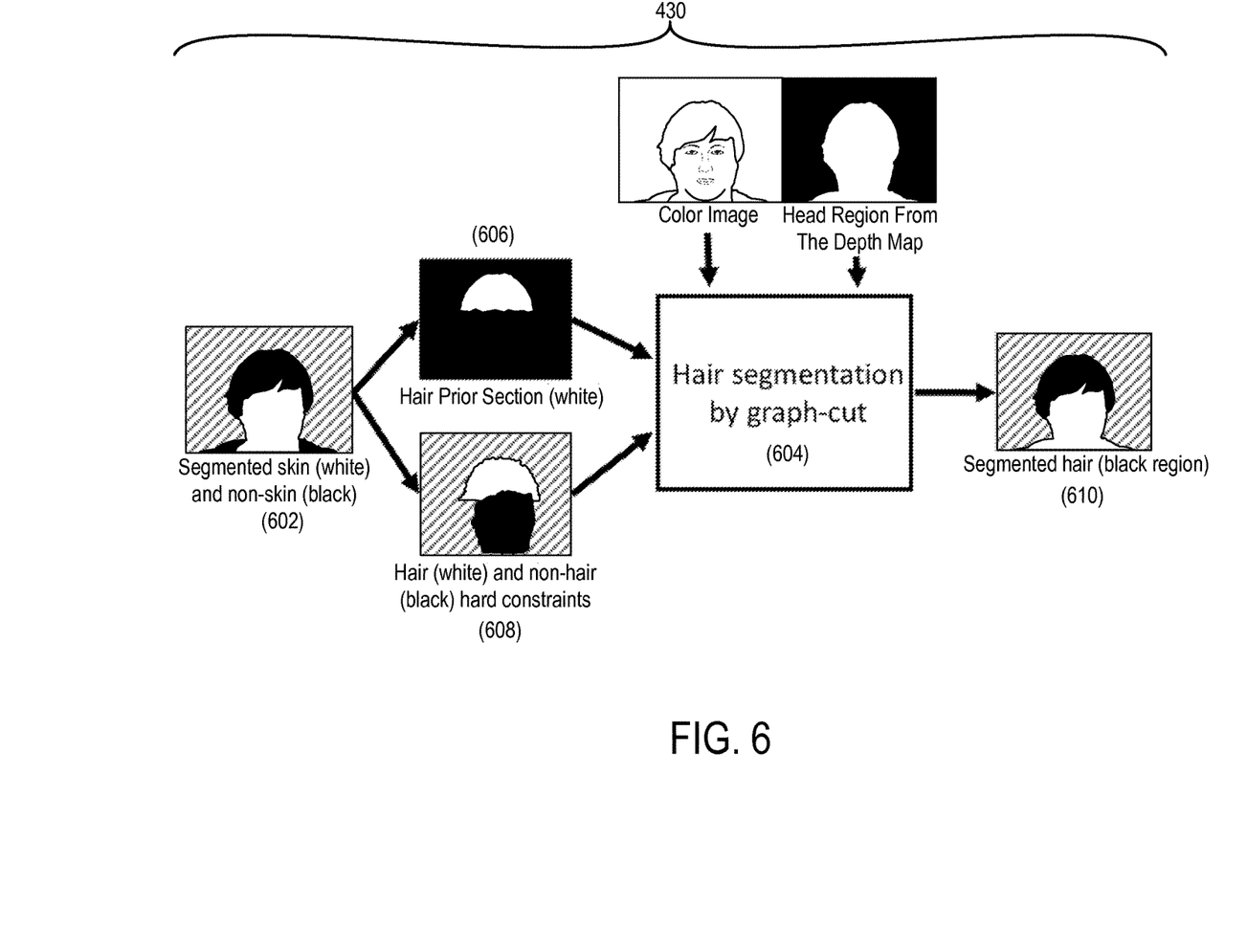
FIG. 6 depicts an example implementation of a process flow for segmenting a hair region given a color image and a depth map associated with the subject.

FIGS. 4-6 show additional use-case workflows for processing images. Specifically, FIG. 4 depicts high level workflow for processing images to achieve segmentation with exemplary graphical representations of how the different image processing operations are applied to a color image and a depth map. FIG. 5 shows a detail process flow of one of the steps shown in FIG. 4 and FIG. 6 shows another detail process flow of another step shown in FIG. 4.

In FIG. 4 as indicated at the top, initial inputs 408 to the workflow includes a color image 402 frame of the subject and an associated depth map 404. Various aspects of the workflow may also make use of an aligned 3-dimensional face mesh 406. The color image, depth map, and face mesh corresponding to common 3-dimensional scene with a human subject.

Various processing operations may make use of the initial inputs to generate a head region (e.g., head mask) in the color coordinate from the depth image (workflow step 410). In the present description, "color coordinate" refers to the pixel resolution of the input color images, (e.g., as determined by a color camera used to capture images of the human subject). "Depth coordinate" refers to the pixel resolution of the depth images that are fed into the workflow, (e.g., as determined by a depth camera and associated hardware that captures depth images of the human subject). Typically, the color coordinate is of a higher resolution than the depth coordinate.

Continuing with the workflow of FIG. 4, after the head region (e.g., head mask) is generated, skin segmentation is performed (workflow step 420), followed by segmentation of the hair region (workflow step 430). In some cases, it will be desirable, as in the depicted example, to perform processing on only a head rectangle region of the subject, which may be obtained by doubling the face bounding rectangle, in one example. Doubling the face bounding rectangle, enables, to a high degree of likelihood, that the analyzed color and depth pixels will include all of the subject's skin and hair. In some examples, the face bounding rectangle may be obtained from the aligned 3-dimensional face mesh.

Referring to workflow step 410, the "head region" is a binary map that indicates, for each pixel in the color image (top left box/input from FIG. 4), whether that pixel is assumed to be part of the human subject (i.e., part of the head, neck, shoulders, etc.) or otherwise, such as a wall in the background of the image frame. The utilized head region in the present examples is in the color coordinate (i.e., of the same resolution as the input color image of the subject). In one example, equation 1 described above, may be used to determine the binary head map. From the binary head map, the method proceeds by finding a region containing the face in the depth coordinate. A Moore-neighborhood boundary trace algorithm may be used to determine the region containing face in the depth coordinate.

In one example, once the boundary is thus identified, it is then converted to the color coordinate, which may be of higher resolution than the depth coordinate, and the region is filled with the mask values. In other words, the final output of workflow step 410—the head region—is a binary map in the resolution of the color image that specifies foreground (i.e., part of the subject's face, shoulders, etc.) or background (i.e., otherwise). The head region may be used for various purposes, as explained in detail below.

Turning now to workflow step 420 (skin segmentation), the segmentation workflow is depicted in FIG. 5. Box 502 implements a graph-cut energy-reduction (e.g., energy-minimization) mechanism that seeks to determine the optimal labeling X (i.e., the labeling of pixels in the head region of workflow step 410 as skin or otherwise) to reduce (e.g., minimize) equation (2), described above.

Boxes 504 and 506 detail an example of how pixels in the frame are determined to be in the foreground region $\mathcal{F}$, background region $\mathcal{B}$ or uncertain region $\mathcal{U}$. The aligned 3-dimensional face mesh may be used to apply a hard constraint, in which specific pixels in the map are designated as being in the foreground region and therefore definitely are the skin of the subject. In the depicted example, regions corresponding to the subject's eyes, nose and mouth are designated as foreground region pixels. These pixels are white in box 506. The top line of Equation (3), described above, may be applied to these pixels, and essentially says that the energy cost of labeling them as skin ($x_i$=1) is very low (zero), and labeling them as not skin ($x_i$=0) entails a very high energy cost ($\infty$).

A background region hard constraint may also be applied to designate background pixels (e.g., non-skin pixels). Starting with the head region (504), a hard constraint may be applied, in which it is assumed that a small band of pixels immediately within the upper portion of the head region boundary are definitely not skin (e.g., the head outline above the ears). In fact, they most likely are the subject's hair. The pixels in this region may be designated as being in the background region (e.g., a non-skin region. These background, "not skin" pixels are black in box 506. The second, middle line of Equation (3), described above, may be applied to these pixels, and essentially says that the energy cost of labeling such a pixel as skin ($x_i$=1) is very high ($\infty$), and labeling it as not skin ($x_i$=0) entails a very low energy cost (0).

Pixels not designated as foreground or background via the hard constraints are deemed to be in the uncertain region $\mathcal{U}$ (i.e., hatched region in box 506). In the bottom line of Equation (3) energy labeling costs for these pixels may be based on the distance between the color of the pixels and foreground and background color distributions, which are obtained as discussed below with reference to boxes 508, 510, and 512.

In previous systems, to get an accurate segmentation result between hair and skin, explicit and manual user interaction has been used to indicate some foreground (e.g., skin) and background (e.g., non-skin) seed pixels. From these seed pixels, foreground and background color distributions are computed. For example, referring to the color image at the top of FIG. 4, a user might have to manually select one or more specific pixels in this image, and possibly in one or more additional previously captured images, to enable the system to determine color distributions corresponding to the subject's skin and color distributions corresponding to the background.

Boxes 508, 510, and 512 provide an alternate mechanism for determining foreground (e.g., skin) and background (e.g., non-skin) color distributions without the need for explicit user input. In particular, this portion of the workflow may be implemented to determine the pixels that will be used to compute the skin color and the non-skin color. In box 512, the white pixels are the pixels that are used to calculate the foreground color distribution; the black pixels are used to calculate the background color distribution.

Referring now to box 508, a skin RGB color model is used to create a skin mask in which the white pixels in the figure are deemed to be potentially skin regions, and the black pixels are deemed to be definitely not skin regions. An example RGB color model to create this map is as follows in pseudo-code:

Distance = max( 95-R, max( 40-G, max( 20-B, max( 15 − ( max( R, max( G, B ) ) − min( R, min( G, B ) ) ), max( 15-(R − G), B-R ) ) ) ) ); where R, G and B range from 0 to 255 and are the color channel values of a given pixel;
Skin mask value $S_i$ for the i-th pixel = 1 (white) if distance ≤ 30;
Skin mask value $S_i$ for the i-th pixel = 0 (black) if distance > 30

In this example, the RGB color model may be derived from analysis of many examples of human skin, perhaps thousands or more. And again, the output of this color model creates a skin mask as shown in box 508 where the white areas potentially are skin, and the black areas definitely are not skin.

As shown at 510, the segmentation workflow may also include detection of hair fringe in order to determine pixels to be used in the foreground and background color distributions. Fringe detection may be implemented with a Sobel edge detector. The example method includes considering pixels that have both strong energy and with edges oriented close within a range to a vertical orientation (e.g., between 0 and 15 degrees from vertical). If a certain number of such fringe pixels exceed some threshold, then there is a positive detection of fringe. In such a case, certain portions of the face mask may be excluded from the foreground region. For example, if fringe is detected, the skin prior section may be set to be equal to the portion of the face mask region below the subject's brows, which may be identified via the aligned 3-dimensional face mesh. Otherwise, a larger region may be used than if fringe were detected. In the depicted example, the smaller region is used due to the presence of detected fringe.

Once the skin prior section is determined at 512, the respective pixels in the foreground section (white) and the background section (black) are used to calculate foreground and background color distributions. In this context, the foreground and background regions refer to a skin section and a non-skin section. In one example method, the RGB image is converted into the YCbCr color space first, and then a computation is performed to compute the Cb and Cr joint histogram of the possible foreground region and the background region, respectively. Cb and Cr are selected in this example because they typically are less sensitive to lighting changes.

Having thus determined foreground and background color distributions, the bottom line of Equation (3) may be applied to the pixels in the uncertain region (pixels in the hatched area of box 506). For the given pixel under consideration, $d_i^{\mathcal{F}}$ is the distance of that pixel's color from the foreground color distribution and $d_i^{\mathcal{B}}$ is the distance of that pixel's color from the background color distribution. For uncertainty region pixels, Equation (3) shows that the cost of labeling a pixel as skin decreases as the pixel's color gets closer to that of the foreground color distribution, and vice versa. Similarly, the cost of labeling a pixel as "not skin" decreases as that pixel's color gets closer to that of the background color distribution, and vice versa.

In one example embodiment, the optimal labeling of "skin" versus "not skin" may be implemented via a max flow analysis of the above graph cut formulation. The skin segmentation output is shown at box 514, in which areas within the head region have been segmented as "skin" (white) and "non-skin" (black). This "non-skin" area can include shoulders or clothes besides the hair.

Once the skin area has been segmented, workflow may then proceed to segmenting the hair (workflow step 430 of FIG. 4). FIG. 6 depicts an example of hair segmentation workflow. At 602, the output of the skin segmentation is depicted, in which areas within the head region have been segmented/labeled as being either skin (white) or non-skin (black). A similar graph-cut energy-minimization mechanism 604 may be applied to segment the hair. As in the skin workflow, this mechanism takes as inputs foreground and background color distributions (discussed with reference to box 606) and a designation of whether a pixel is in a foreground region, background region, or uncertain region (discussed with reference to box 608). Equations (2) and (3) may be then applied with a max flow analysis to find an optimal labeling of the pixels as being "hair" or "not hair."

The "hair prior section" (white in box 606) is determined to be the segmented non-skin region above the subject's ears and within the interior of the head region. Ears may be known/identified from the aligned 3-dimensional face mesh. This region most likely is hair, and these pixels therefore are used to determine the foreground (i.e., hair) color distribution. The remaining pixels in the black region of box 606 are used to calculate the background (i.e., non-hair) color distribution. These distributions may be calculated similarly as described above (e.g., via conversion to YCbCr color space) and may be used in calculating energy for pixels in the uncertain region (i.e., pixels that are not deemed to be definitely hair or definitely not hair)—line 3 of Equation (3).

In box 608, the hair prior section used in box 606 may also be used as a hard constraint to designate pixels within the region as being definitely hair and therefore foreground pixels for purposes of the top line of Equation (3). The segmented skin region is the hard constraint to designate pixels as definitely non-hair and therefore background pixels for purposes of the middle line of Equation (3).

Finally, as with the skin segmentation, a max flow approach may be used to generate a hair segmentation output at box 610, in which areas within the head region are labelled (e.g., optimally labelled) as "hair" (black) or not-hair (white or hatched).

Figure 7:
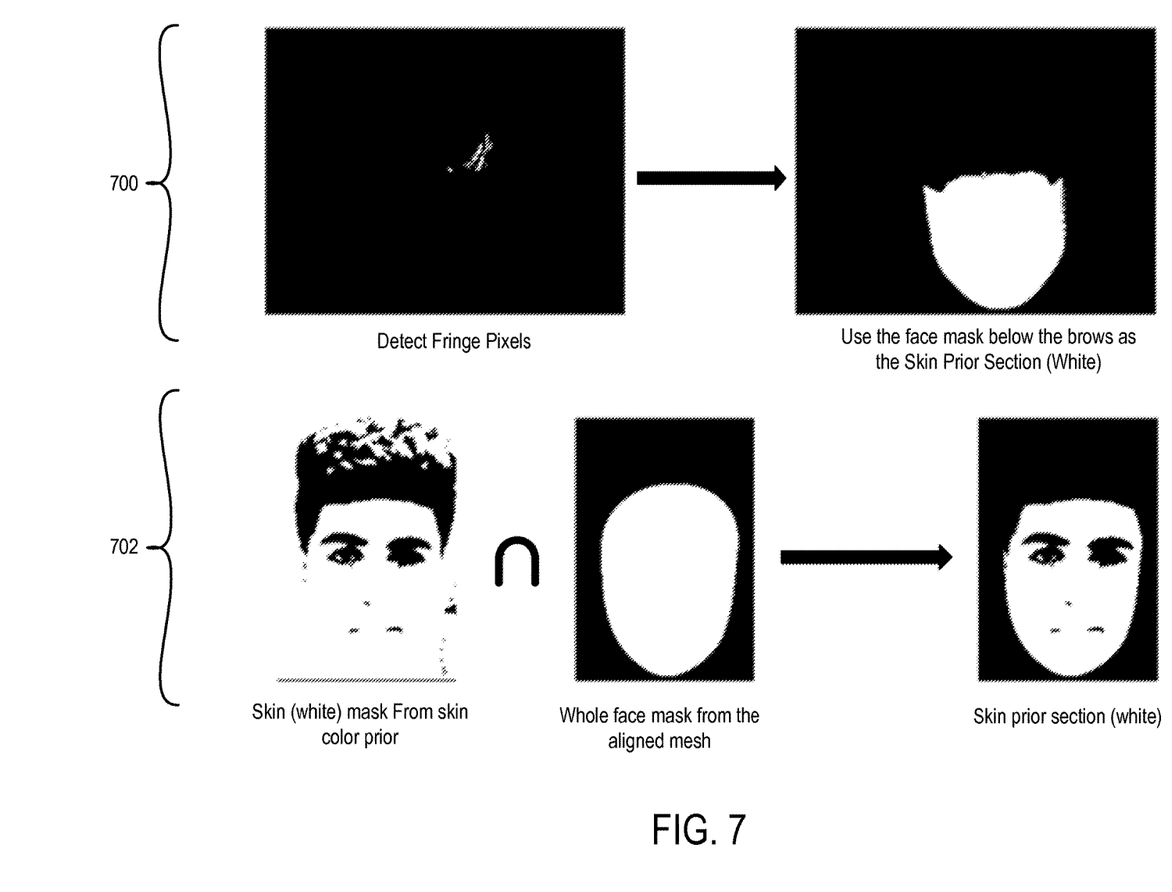
FIG. 7 depicts an example implementation of process flows for determining skin prior sections.

FIG. 7 shows a flow diagram depicting two exemplary process flows (700 and 702) used to determine a skin prior section. It will be appreciated that the human subject shown in FIG. 7 is different from the human subject shown in FIGS. 4-6. As shown at 700, fringe pixels may be used to determine a skin prior section which is defined as a section of the head region below the brows. As shown at 704, the intersection between a skin mask and a whole face mask is used to determine a skin prior section.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The subject matter of the present disclosure is further described in the following paragraphs. According to one aspect a method for operating an image processing device coupled to a color camera and a depth camera is provided. The method includes receiving a color image of a 3-dimensional scene from a color camera; receiving a depth map of the 3-dimensional scene from a depth camera; generating an aligned 3-dimensional face mesh from a plurality of color images received from the color camera indicating movement of a subject's head within the 3-dimensional scene and from the depth map; determining a head region based on the depth map; segmenting the head region into a plurality of facial sections based on both the color image, depth map, and the aligned 3-dimensional face mesh; and overlaying the plurality of facial sections on the color image.

In this aspect, determining the head region may include determining a head map having foreground pixels and background pixels from the depth map and converting the head map to color coordinates corresponding to the color image to create the head region.

In this aspect, determining the head region and segmenting the head region may be automatically implemented independent of user interaction with the image processing device.

In this aspect, the plurality of facial sections may be segmented based on an energy function configured to determine the energy cost of pixels for each of the facial sections.

In this aspect, determining the head region may include using a nose-tip as a seed point in the depth map and applying a head outline algorithm to the depth map.

In this aspect, the facial sections may include a hair section and a skin section.

In this aspect, the skin section may be automatically inferred based on a fringe detector, a prior skin red green blue (RGB) color threshold, and the aligned 3-dimensional face mesh.

In this aspect, the fringe detector may be a Sobel edge detector.

In this aspect, the skin section may include a nose sub-region, an eye sub-section, a mouth sub-section, and an ear sub-section.

In this aspect, a border between the hair section and the skin section may be determined based on angular orientations of pixels in the color image.

In this aspect, the head region may be a binary map.

In this aspect, the head region may be calculated based on a Moore-Neighborhood algorithm.

In this aspect, the color image and depth map may be generated in response to user input received via the image processing device.

In this aspect, the color image may be a red green blue (RGB) image and where segmenting the head region includes converting the color image to a YCbCr image and determining a blue difference chroma (Cb) and a red different chroma (Cr) joint histogram.

In this aspect, the pixel resolution of the color image is greater than the pixel resolution of the depth image.

According to another aspect, a camera system is provided which includes a color camera; a depth camera; and an image processing device in electronic communication with the color camera and the depth camera configured to: receive a color image of a 3-dimensional scene from a color camera;

receive a depth map of the 3-dimensional scene from a depth camera; generate an aligned 3-dimensional face mesh from movement of a subject's head within the 3-dimensional scene detected via the color camera and from the depth map; automatically determine a head region based on the depth map in response to generating the color image and depth map; segment the head region into a first section and a second section based on the color image, the depth map, and aligned 3-dimensional face mesh in response to determining the head region; and overlay the first and second sections on the color image.

In this aspect, automatically determining the head outline may include using a nose-tip as a seed point in the depth map and applying a head outline algorithm to the depth map.

In this aspect, the first section may be a skin section and the second section is a hair section.

According to another aspect, a method for operating an image processing device coupled to a color camera and a depth camera is provided. The method includes receiving a color image of a 3-dimensional scene from a color camera; receiving a depth map of the 3-dimensional scene from a depth camera; generating an aligned 3-dimensional face mesh from movement of a subject's head within the 3-dimensional scene detected via the color camera and from the depth map; automatically determining a head region based on the depth map in response to generating the color image and the depth map; segmenting the head region into a skin section based on the color image, the depth map, and aligned 3-dimensional face mesh in response to determining the head outline; segmenting the head region into a hair section based on the color image, the depth map, and the aligned 3-dimensional face mesh in response to segmenting the skin region; and overlaying the skin section and the hair section on the color image in response to segmenting the head region into the skin section and the hair section.

In this aspect, the method may further include segmenting the head region into the skin section includes implementing a fringe detector configured to determine if a pixel is within the skin section based on the edge orientation of the pixel.

The invention claimed is:

1. A method for operating an image processing device coupled to a color camera and a depth camera, comprising:
    receiving a color image of a 3-dimensional scene from a color camera;
    receiving a depth map of the 3-dimensional scene from a depth camera, the depth map including depth values assigned to pixels;
    generating an aligned 3-dimensional face mesh from a plurality of color images received from the color camera indicating movement of a subject's head within the 3-dimensional scene and from the depth map, the aligned 3-dimensional face mesh including a plurality of vertices, edges, and faces that define a shape of the subject's head;
    determining a head region based on the depth map;
    segmenting the head region into a plurality of facial sections based on each of the color image, depth map, and the aligned 3-dimensional face mesh; and
    overlaying the plurality of facial sections on top of the color image.

2. The method of claim 1, where determining the head region includes determining a head map having foreground pixels and background pixels from the depth map and converting the head map to color coordinates corresponding to the color image to create the head region.

3. The method of claim 1, where determining the head region and segmenting the head region are automatically implemented independent of user interaction with the image processing device.

4. The method of claim 1, where the plurality of facial sections are segmented based on an energy function configured to determine an energy cost of pixels for each of the facial sections, the energy cost representing costs of assigning pixels to one of the facial sections and the energy cost function stored in memory and executed by a processor in the image processing device.

5. The method of claim 1, where determining the head region includes using a nose-tip as a seed point in the depth map and applying a head outline algorithm to the depth map.

6. The method of claim 1, where the facial sections include a hair section and a skin section.

7. The method of claim 6, where the skin section is automatically inferred based on a fringe detector, a prior skin red green blue (RGB) color threshold, and the aligned 3-dimensional face mesh.

8. The method of claim 7, where the fringe detector is a Sobel edge detector.

9. The method of claim 6, where the skin section includes a nose sub-region, an eye sub-section, a mouth sub-section, and an ear sub-section.

10. The method of claim 6, where a border between the hair section and the skin section is determined based on angular orientations of pixels in the color image.

11. The method of claim 1, where the head region is a binary map.

12. The method of claim 1, where the head region is calculated based on a Moore-Neighborhood algorithm.

13. The method of claim 1, where the color image and depth map are generated in response to user input received via the image processing device.

14. The method of claim 1, where the color image is a red green blue (RGB) image and where segmenting the head region includes converting the color image to a YCbCr image and determining a blue difference chroma (Cb) and a red difference chroma (Cr) joint histogram.

15. The method of claim 1, where a pixel resolution of the color image is greater than a pixel resolution of the depth image.

16. A camera system comprising:
    a color camera;
    a depth camera; and
    an image processing device in electronic communication with the color camera and the depth camera configured to:
        receive a color image of a 3-dimensional scene from the color camera;
        receive a depth map of the 3-dimensional scene from the depth camera, the depth map including depth values assigned to pixels;
        generate an aligned 3-dimensional face mesh from movement of a subject's head within the 3-dimensional scene detected via the color camera and from the depth map, the aligned 3-dimensional face mesh including a plurality of vertices, edges, and faces that define a shape of the subject's head;
        automatically determine a head region based on the depth map in response to receiving the color image and depth map;
        segment the head region into a first section and a second section based on each of the color image, the depth map, and aligned 3-dimensional face mesh in response to determining the head region; and overlay the first and second sections on top of the color image.

17. The camera system of claim 16, where automatically determining the head region includes using a nose-tip as a seed point in the depth map and applying a head outline algorithm to the depth map.

18. The camera system of claim 16, where the first section is a skin section and the second section is a hair section.

19. A method for operating an image processing device coupled to a color camera and a depth camera, comprising:
   receiving a color image of a 3-dimensional scene from the color camera;
   receiving a depth map of the 3-dimensional scene from the depth camera, the depth map including depth values assigned to pixels;
   generating an aligned 3-dimensional face mesh from movement of a subject's head within the 3-dimensional scene detected via the color camera and from the depth map, the aligned 3-dimensional face mesh including a plurality of vertices, edges, and faces that define a shape of the subject's head;
   automatically determining a head region based on the depth map in response to receiving the color image and the depth map;
   segmenting the head region into a skin section based on each of the color image, the depth map, and aligned 3-dimensional face mesh in response to determining the head region;
   segmenting the head region into a hair section based on each of the color image, the depth map, and the aligned 3-dimensional face mesh in response to segmenting the head region into the skin section; and
   overlaying the skin section and the hair section on top the color image in response to segmenting the head region into the skin section and the hair section.

20. The method of claim 19, where segmenting the head region into the skin section includes implementing a fringe detector configured to determine if a pixel is within the skin section based on an edge orientation of the pixel.

* * * * *